US005386113A

United States Patent [19]

Franzen et al.

[11] Patent Number: 5,386,113

[45] Date of Patent: Jan. 31, 1995

[54] METHOD AND DEVICE FOR IN-PHASE MEASURING OF IONS FROM ION TRAP MASS SPECTROMETERS

[75] Inventors: Jochen Franzen, Bremen; Gerhard Heinen, Grasberg; Gerhard Weiss, Weyhe; Reemt-Holger Gabling, Bremen, all of Germany

[73] Assignee: Bruker-Franzen Analytik GmbH

[21] Appl. No.: 996,008

[22] Filed: Dec. 23, 1992

[30] Foreign Application Priority Data

Dec. 23, 1991 [DE] Germany ............................ 4142870

[51] Int. Cl.[6] ........................ B01D 59/44; H01J 49/00

[52] U.S. Cl. ..................................... 250/292; 250/282

[58] Field of Search ................................ 250/282, 292

[56] References Cited

U.S. PATENT DOCUMENTS

| | | | |
|---|---|---|---|
| 4,573,175 | 2/1986 | Cressey | 377/44 |
| 4,650,999 | 3/1987 | Fies et al. | 250/292 |
| 4,695,724 | 9/1987 | Watanabe et al. | 250/292 |
| 5,028,777 | 7/1991 | Franzen et al. | 250/292 |
| 5,047,636 | 9/1991 | Farrar et al. | 250/292 |
| 5,233,190 | 8/1993 | Schlereth et al. | 250/282 |
| 5,298,746 | 3/1994 | Franzen et al. | 250/292 |

FOREIGN PATENT DOCUMENTS

| | | |
|---|---|---|
| 1195572 | 6/1970 | European Pat. Off. . |
| 0262928 | 4/1988 | European Pat. Off. . |
| 0270232 | 6/1988 | European Pat. Off. . |

OTHER PUBLICATIONS

Quadrupole Storage Mass Spectrometry, March et al. (1989), pp. 365–378, *A Wiley-Interscience Publication.*

Quadrupole Ion Store (Quistor) Mass Spectrometry, Griffiths et al., (1990), pp. 79–98, *International Journal of Mass Spectrometry and Ion Processes.*

*Primary Examiner*—Bruce C. Anderson

*Attorney, Agent, or Firm*—Cesari and McKenna

[57] ABSTRACT

The measuring process for generating mass spectra using a sequentially-scanned quadrupole ion trap mass spectrometer, is improved by controlling the measurement of the ion packages ejected from the ion trap so that measurement takes place starting at the anticipated exit times of the ion packages and measurement continues only as far as possible for a time duration corresponding to the length of the ion packages. Measuring only during ion package ejection enables a measurement for the total number of ejected ions having a selected mass to be obtained by means of digital addition of the individual package measurements. Subsequent processing of the data can be carried out with practically only the fluctuations of normal ion counting statistics.

34 Claims, 2 Drawing Sheets

METHOD AND DEVICE FOR IN-PHASE MEASURING OF IONS FROM ION TRAP MASS SPECTROMETERS

FIELD OF THE INVENTION

The invention concerns methods and devices for recording mass spectra by using an RF quadrupole ion trap in which ions are retained in the trap by a storage RF voltage applied between the trap end caps and ejected mass-sequentially through holes in one of the ion trap end caps under the influence of an RF excitation voltage.

BACKGROUND OF THE INVENTION

Quadrupole ion traps according to Paul and Steinwedel (DE-PS 944 900) consist of ring and end cap electrodes between which an essentially quadrupolar storage field is generated by applying RF voltages to the ring and end caps. Ions with varying mass-to-charge ratios (m/q) can be stored at the same time in this field (for the sake of simplicity, only "masses" instead of "mass-to-charge ratios" will be referred to in the following since, in ion traps, one is predominantly only concerned with singly-charged ions).

In such ion traps, the ions can be excited in resonance with the mass-specific frequency of their secular oscillation by applying an RF excitation field to the ion trap end caps as described in an article entitled "The Three-dimensional Stabilization of Charge Careers in a Quadrupole Field", E. Fischer. Inaugural Doctoral Thesis, University of Bonn, 1958. This excitation causes ions with a specific mass to absorb energy from the field and to enlarge their oscillation amplitudes. The enlarged oscillation amplitude causes the ions to leave the ion trap through perforations in one of the end caps and the ions which leave can be detected outside the trap with an ion detector as described in an article by G. Rettinghaus, *Center for Applied Physics* v. 22, p. 321 (1967). For measurement of the mass spectra, ions with different masses are sequentially brought into a resonance condition of this kind by changing the quadrupole RF storage field so that the ions are ejected mass by mass.

Physically intrinsic resonance conditions of the storage field are preferably used to increase ion ejection. With a pure quadrupole field, resonance conditions of this kind are found at the edge of the stability zone in the a,q diagram as described in EP-A1 0 350 159. In addition, certain nonlinear resonance conditions in particular, those which occur in the case of a superposition of multipole fields, can also be used for ion ejection. For example, the use of a nonlinear octopole resonance, $\beta_z+\beta_r=1$, applied after the initial push of the secular oscillation with a fixed-phase frequency of precisely one third of the storage frequency is well-known for ion ejection as described in EP-A1 0 383 961.

FIG. 1 shows some known storage field resonance conditions both for a pure quadrupole field and for superposed hexapole and octopole fields plotted on an a,q stability diagram. The storage field resonances, $\beta_z=1$ (for pure quadrupole), $\beta_z=\frac{2}{3}$ (for hexapole superposition), $\beta_z+\beta_r=1$ and $\beta_z=\frac{1}{2}$ (both for octopole superposition), have been plotted. The following applies in the customary manner:

$$a=-8zU/(mr_0^2\omega^2),\ q=4zV/(mr_0^2\omega^2)$$

where:

- z=Coordinate of the rotationally symmetric axis of the ion trap,
- U=Direct voltage with which the RF storage field is superposed,
- m=Mass of ions,
- $r_0$=Inside radius of the ring electrode,
- ω=Angular frequency of the storage RF, and
- V=Amplitude (voltage) of the storage RF The advantages of these superposed multipole fields are discussed in detail in the *International Journal of Mass Spectroscopy Ion Processes*, J. Franzen, v. 106, pp. 63–78 (1991) which article is hereby incorporated by reference. Resonance conditions at the center of the stability zone can also be produced by adding RF alternating fields with frequencies $f<F/2$ where F is the frequency of the storage field.

In contrast to the exponential rise in ion oscillation amplitude caused by ion absorption of energy from various storage field resonances, the absorption of energy by the ions from the excitation field causes their secular oscillation amplitudes to increase only linearly. Therefore, ion ejection caused by storage field resonances is very much sharper and can be concluded in fewer oscillation cycles.

The secular oscillation frequency of the ions varies widely after their production or introduction. Consequently, in order to provide a well-resolved mass spectrum, it is necessary to first collect the oscillating ions confined in the ion trap near the center of the ion trap to enable the ions of successive masses to leave the ion trap in ejection cycles clearly separated from each other in terms of time. For this, the ion trap is preferably filled with a special damping gas having an optimal density enabling the ions to release energy by colliding with the remaining gas in the trap. When such a gas is introduced, the trapped ions "thermalize" after a few collisions and collect at the center of the quadrupole field due to the focusing effect of the quadrupole field, reducing their oscillation amplitudes at the same time. They form a small cloud, the diameter of which is only approximately 1/20 to 1/10 of the dimensions of the trap according to tests carried out with laser beams as described in *Physical Review A*, I. Siemers, R. Blatt, T. Sauter and W. Neuhauser, v. 38, p. 5121 (1988) and *Journal of the Optical Society of America B*, M. Schubert, I. Siemers and R. Blatt. v. 6, p. 2159 (1989). Thermalization takes place particularly quickly with medium-weight damping gas molecules such as air.

If the ions of a selected mass are now coherently pushed out of the cloud under the foregoing resonance conditions, they absorb further energy practically synchronously. If the diameter of the ion cloud of a selected ion mass does not greatly enlarge, but the oscillation amplitude markedly increases, all ions of the selected mass then leave the ion trap in just a few oscillation cycles. By experiment, the ions of a mass can be practically completely ejected in approximately 5 to 7 oscillations, utilizing storage field nonlinear resonances. This provides a very good mass resolution, even with very fast scanning methods.

Measurement of the ions leaving the ion trap is customarily carried out with a secondary-emission multiplier, providing practically delay-free amplification of the ion signal by a factor of $10^5$ to $10^7$. The outgoing electron emission current of the secondary-emission multiplier is usually fed, via an impedance converter (electrometer amplifier), to a clocked digitizing stage (analog/digital converter or ADC). The size of the bandwidth of the impedance converter is selected in such a way that the intensity progression via the ion stream profile of a mass is spread as little as possible. However, the ion signals, which occur like pulses, are to be integrally smoothed to the point that a fairly monotonic progression of the ion stream profile of a mass is produced. In doing so, the clock pulse of the converter is matched to the bandwidth of the impedance converter in such a way that the digital numbers generated reflect the signal progression without considerable losses. The string of digits forms the "raw spectrum" which can be processed further in a data system in known manner.

This method also provides satisfactory results for a slow mass scan, in which the ion profile of a mass consists of a great number of individual ion packages. For fast scans, however, which consist of only 5 to 7 ion packages, as described above, spectra recorded in this manner have two serious drawbacks: Firstly, signals for individual ion masses have much greater fluctuations than are to be anticipated according to statistical expectations based on ion numbers.

Secondly, the signals have relatively marked background noise due to ions taken out of their orderly ejection rhythm by collisions with molecules of the damping gas. This background noise obstructs the identification of very small ion signals. The background noise is also present with the slow scan but is less conspicuous due to the overall poorer level of detection.

It is the task of this invention to reduce both signal fluctuations and background noise in the spectrum measured. For this, it is necessary to understand the reasons for the signal fluctuations and noise background.

More particularly, the ions are ejected from the ion trap at regular intervals. Each time the oscillating ion cloud reaches the perforated end cap, enlarging its oscillation amplitude by absorbing energy from the storage field, an ion package from the front of the cloud reaches the holes and escapes through them. By means of an oscillograph, it is possible to establish that the ion packages (or ion pulses) are very short in terms of time, only lasting approximately 30 to 100 nanoseconds. Since the secular frequency cycle is approximately 3 microseconds, the current pulses of the ion packages occupy only 1/100 to 1/30 of the total scan time.

Despite the very brief time between resonance start and ejection of the ion packages, some unavoidable disruptive collisions between the oscillating ions and the damping gas take place in the ion trap. The disturbed ions assume disorderly forms of trajectories and are able to evade orderly ejection. They are, however, able to leave through the holes in the further course of the scan and are detected by the ion detector. Since these ions are no longer related to the orderly-ejected ions, they form a disturbing noise background. Since they no longer move coherently to the ions of a mass, they are uniformly distributed across the scan time, in particular thus also appearing between the individual orderly ion pulses.

In addition, it is no longer possible to produce a good compromise for measurement of the ion stream profile of an ion mass only consisting of 5 to 7 ion packages by the setting of the bandwidth of an amplifier. The demand for integral smoothing of signals requires a slow amplifier. A fast mass sequence, however, necessitates a very fast amplifier. A fast amplifier inevitably results in an ion signal appearing to be broken up which, in connection with the clock-pulse rate of the digitizer, leads to erratic sequences of numbers, from which it is scarcely possible to identify the signal profile of the ion masses.

SUMMARY OF THE INVENTION

According to the invention, the improvement of the measuring process for spectra consists in controlling the measurement of the ion packages ejected from the ion trap so that measurement takes place starting at the anticipated exit times of the ion packages and measurement continues only as far as possible for a time duration corresponding to the length of the ion packages. Measuring only during ion package ejection enables a measurement for the total number of ejected ions having a selected mass to be obtained by means of digital addition of the individual package measurements. Subsequent processing of the data can be carried out with practically only the fluctuations of normal ion counting statistics. In addition, all scattered ions occurring in the time between the measuring periods are removed from the spectrum.

The clock pulse of the excitation RF is used as an approximation for the correct measuring frequency. Measurement of the ion packages must, however, be additionally provided with an adjustable phase displacement (lock-in measurement principle). 50% of the ions of a mass are typically ejected in approximately 3 secular frequency cycles, approximately 90% in 5 cycles and approximately 100% in 7 cycles. With so few cycles, any slight phase displacement between the secular frequency at the lime of resonance with the excitation RF and the time of ion ejection is of minor importance.

Therefore, according to one embodiment of the invention the ejected ion pulses are measured at the rate of the excitation RF. In so doing, it must be possible to set the phase position of the measurements experimentally. The length of each individual measurement is of secondary importance and can be permanently set after individual optimization. In accordance with one embodiment of the invention the duration of the measurement "window" is approximately 100 nanoseconds.

DETAILED DESCRIPTION OF THE PREFERRED EMBODIMENT

Figure 1:
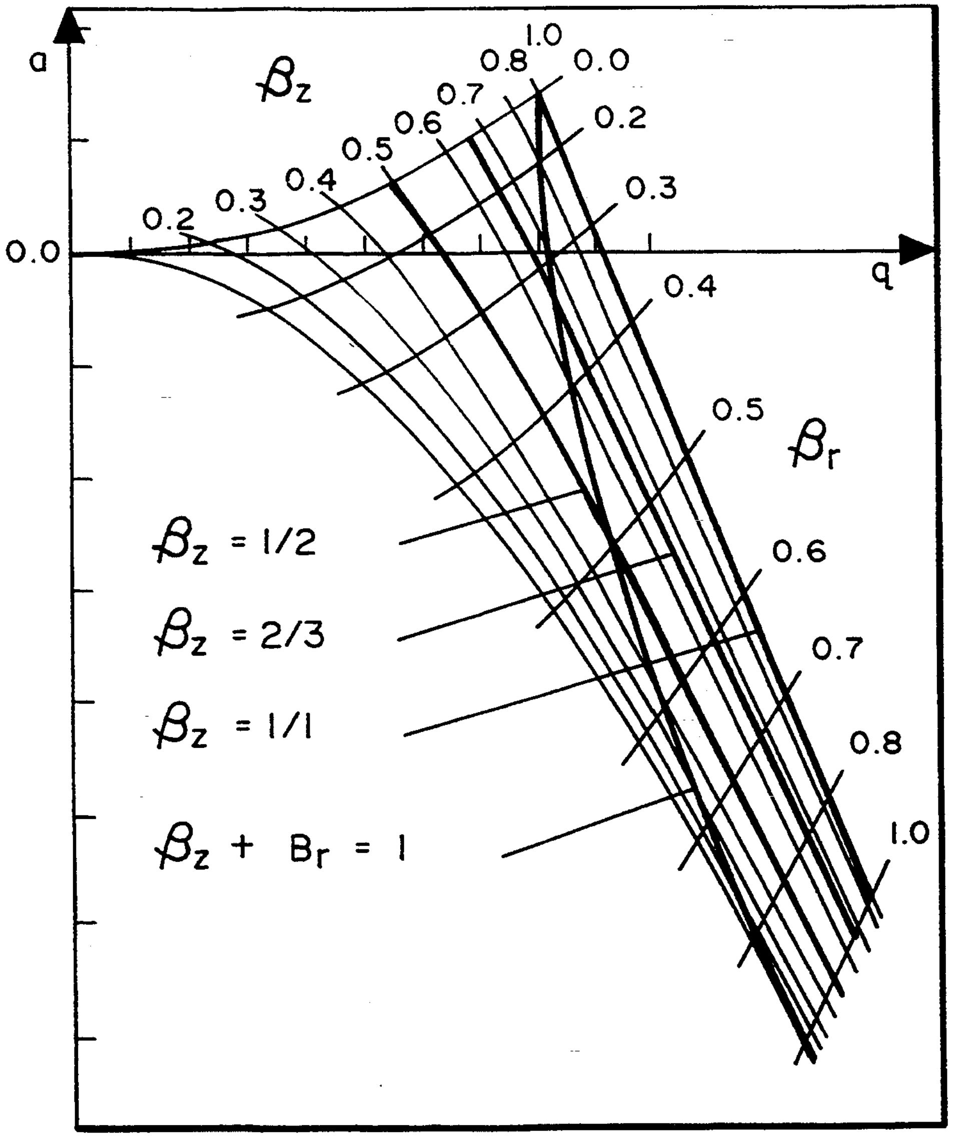
FIG. 1 is an a,q stability diagram with isobeta lines describing the secular frequencies in the r and z directions.
Figure 2:
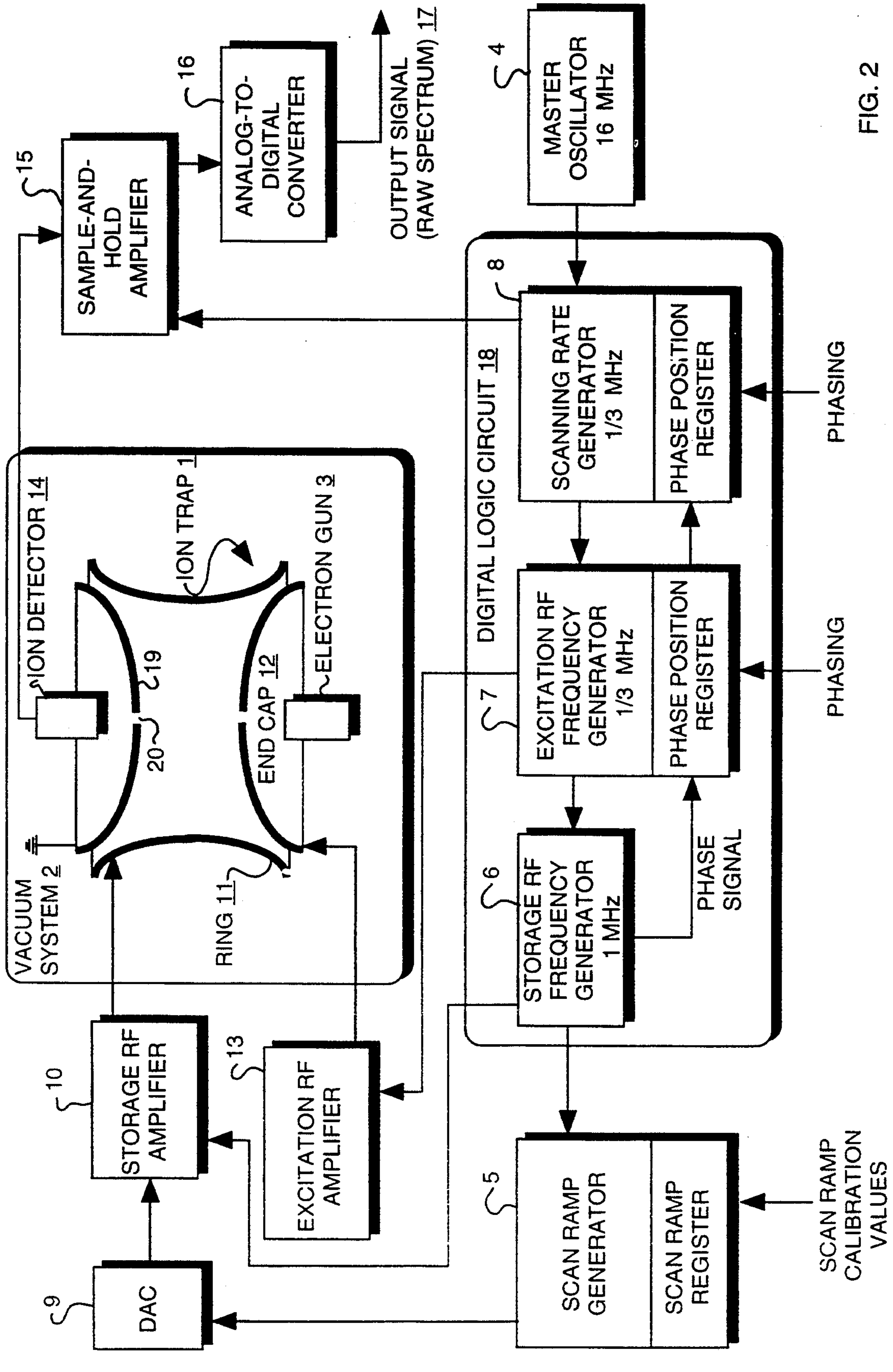
FIG. 2 is a preferred block diagram of circuitry for supplying the ion trap with the necessary RF voltages and for measurement of the ion pulse streams for production of a mass spectrum.

A preferred device for carrying out the method is shown in FIG. 2 as a block diagram. Digital control of the phase relationships and phase positions of the excitation RF and scanning rate with regard to the storage RF is particularly shown. Measurement with the correct clock pulse and correct phase position produces a substantial improvement in signal noise and the signal-to-noise ration with this embodiment over the prior art.

The ion trap (1) consists of a ring electrode (11) and end cap electrodes (12) and (19). The ion trap (1) is located in a vacuum system (2) and can be filled through an inlet (not shown) with traces of substances, the mass spectra of which are to be recorded, and with a collision gas for damping the ion oscillations. A weak octopole field is superposed on the quadrupole field of the ion trap (1) by the shape of the electrodes (not shown in detail in the diagram) in accordance with the disclosure of DE-OS 40 17 264.3 which is hereby incorporated by reference.

An electron gun (3) produces a pulse-like controllable electron beam. The beam generates ions of the substances in the ion trap during an ionization period, which ions are then thermalized in a subsequent damping interval by collisions with the collision gas.

The ion trap (1) is controlled by a digital logic circuit (18) which also controls the measurement circuitry. The digital logic circuit is, in turn, controlled by a master oscillator (4) operating at a 16 MHz clock rate. The output of the master oscillator is divided down to generate various clock frequencies by means of conventional divider circuits (not shown). The basic pulse rate of the scan ramp generator (5) is one MHz. The frequency of the storage RF frequency generator (6) is also one MHz and the frequencies of the excitation RF frequency generator (7) and the scanning rate generator (8) for sample-and-hold amplifier (15) are ⅓ MHz. The phasing of the RF frequency generator (7) and the scanning rate generator (8) outputs can be independently set relative to the storage RF frequency generator output by means of digital phasing signals introduced into phase position registers. In addition, the scan ramp generator (5) can be digitally provided with calibration values for the ion mass scan by means of a scan ramp register. In accordance with other embodiments of the invention optimal ion ejection may be achieved by controlling the frequency and the amplitude of the excitation RF voltage in accordance with the storage RF frequency and other considerations. Control of the excitation RF voltages is described in detail in copending patent applications entitled "Method and Device for Control of the Excitation Voltage For Ion Ejection From Ion Trap Mass Spectrometers" filed on the same date as this application by Jochen Franzen and Reemt-Holger Gabling and assigned to the same assignee as the present application and "Method and Device For In-phase Excitation of Ion Ejection From Ion Trap Mass Spectrometers" filed on the same date as the present application by Jochen Franzen and assigned to the same assignee as the present application. The disclosure of both of the foregoing application is hereby incorporated by reference.

The scan ramp generator (5) generates a digital scan ramp waveform which is converted to an analog ramp signal by digital/analog converter (DAC) (9). The resulting analog ramp signal is applied to the storage RF amplifier (10) to control the amplitude of the RF storage output. The output frequency of amplifier (10) is controlled by the output of the storage RF frequency generator (6).

In the illustrative embodiment, the storage RF amplifier output is only connected to the ring electrode (11), end cap electrode (19) is earthed, and a second end cap electrode (12) is connected to the output of RF excitation amplifier (13) to receive a weak excitation RF voltage. Experimental findings show that no harm is caused whatsoever by the slight asymmetry of the electrode voltages. The frequency of the excitation RF amplifier (13) is controlled by the output of the excitation RF frequency generator (7).

The ions ejected from ion trap (1) via slots (20) are measured via an ion detector (14), which is preferably a secondary-emission multiplier. The analog signal from the secondary-emission multiplier, amplified with practically no time delay, is supplied to a phase-sensitive ion signal amplifier, in this case a sample-and-hold amplifier (15). As previously mentioned, the clock pulse, phase and length of sample times of amplifier (15) are controlled by the scanning rate generator (8). The voltages generated at the amplifier output are then digitized in an analog-to-digital converter (16) with the same clock-pulse rate of 3 microseconds being used. The consecutive digital values of the output signal (17) from the raw spectrum which can be processed further with known means in a data system to generate the desired spectral output.

The digital circuits of the storage RF frequency generator (6), the excitation RF frequency generator (7) and the scanning rate generator (8) can be combined in a digital logic circuit (18) which can be accommodated m a single module, e.g. a logic cell array (LCA).

What is claimed is:

1. A method for recording a mass spectrum of ions utilizing apparatus including a storage ion trap, a mechanism for introducing the ions into the storage ion trap, a mechanism for collecting the ions near the center of the ion trap and an ion detector for detecting the ions leaving the ion trap and for generating an ion signal, the method comprising the steps of:

A. controlling the ion trap to consecutively eject ion pulses from the ion trap; and B. controlling the detector in substantial synchronization with said controlling of the ion trap such that ions are detected only during times when ion pulses are being ejected from the storage ion trap.

2. A method according to claim 1 wherein step A comprises the steps of:

A1. applying a storage RF signal with a frequency to the storage ion trap;

A2. applying an excitation RF signal with a frequency to the storage ion trap; and A3. varying the storage RF signal amplitude.

3. A method according to claim 2 wherein step B comprises the steps of:

B1. determining the frequency of the excitation RF signal;

B2. determining the phase of the excitation RF signal; and

B3. generating an output of the ion detector periodically using a periodic scanning signal which output has a frequency that is substantially equal to the excitation RF signal and a phase relative to the phase of the excitation RF signal.

4. A method according to claim 3 wherein the frequency of the scanning signal equals the frequency of the excitation RF signal.

5. A method according to claim 4 further comprising:

C. adjusting the relative phase between the scanning signal and the excitation RF signal to maximize the output of the ion detector.

6. A method according to claim 4 wherein the scanning signal and the excitation RF signal are both derived from a single oscillator.

7. A method according to claim 6 wherein the storage RF signal is also derived from said single oscillator.

8. A method according to claim 3 wherein the ions in the storage trap consist of groups of ions, each group consisting of one of a finite number of predetermined masses, each group of ions of a predetermined mass being ejected in the form of pulses during a successive period of time.

9. A method according to claim 8 wherein the storage RF signal amplitude is varied in such a manner that each of said successive periods of time is substantially of equal length.

10. A method according to claim 3 wherein the periodic scanning signal consists of periodic clock pulses which enable the detector output and a duration of one of the clock pulses substantially equals a duration of one of the ion pulses.

11. Apparatus for improving a mass spectrum of ions generated by a mass spectrometer having a storage ion trap, a mechanism for introducing the ions into the storage ion trap, a mechanism for collecting ions near the center of the ion trap, a mechanism for controlling the ion trap to consecutively eject ion pulses from the ion trap and an ion detector for detecting the ions leaving the ion trap and for generating an ion signal, the apparatus comprising:

a circuit for controlling the ion detector in substantial synchronization with said mechanism for controlling the ion trap to enable an ion signal output only during times when ion pulses are being ejected from the storage ion trap so that successive values of the ion signal are output; and an analog-to-digital converter for digitizing the successive values of the ion signal.

12. Apparatus according to claim 11 wherein the controlling circuit comprises a circuit for controlling the ion detector to detect ions only during times when ion pulses are being ejected from the storage ion trap.

13. Apparatus according to claim 11 wherein the controlling circuit comprises a circuit for sampling the ion signal only during times when ion pulses are being ejected from the storage ion trap.

14. Apparatus for recording a mass spectrum of ions comprising:

a storage ion trap;

means for placing ions in the storage ion trap;

means for collecting the ions near the center of the trap;

a storage RF signal generator for producing an ion storage field in the storage ion trap;

an excitation RF signal generator for producing an excitation RF signal and an excitation field in the storage ion trap; and a signal generator responsive to ions leaving the storage ion trap and substantially synchronized with the excitation RF signal for generating an ion stream signal only while ion pulses are being ejected from the storage ion trap.

15. Apparatus according to claim 14 wherein the signal generator comprises:

an ion detector responsive to ions for generating the ion stream signal;

a control circuit responsive to the excitation RF signal for controlling the ion detector in substantial synchronization with the excitation RF signal to enable the ion stream signal only when ion pulses are being ejected from the storage ion trap; and a spectrum generator responsive to the ion stream signal for generating a mass spectrum signal.

16. Apparatus according to claim 15 wherein the spectrum generator comprises an analog to digital converter.

17. Apparatus according to claim 14 wherein the signal generator comprises:

an ion detector responsive to ions for generating an ion stream signal;

a sample and hold circuit responsive to a scanning signal which is substantially synchronized with the excitation RF signal for sampling the ion stream signal only when ion pulses are being ejected from the storage ion trap; and a spectrum generator responsive to the sampled ion stream signal for generating a mass spectrum signal.

18. Apparatus according to claim 17 wherein the sample and hold circuit comprises a phase-sensitive signal amplifier responsive to the scanning signal.

19. Apparatus according to claim 18 wherein the scanning signal has a frequency which is equal to the excitation RF signal frequency, 20. Apparatus of claim 19 further comprising a phase adjustor for adjusting a relative phase between the scanning signal and the excitation RF signal.

21. Apparatus according to claim 17 wherein the scanning signal consists of periodic clock pulses and a duration of one of the clock pulses substantially equals a duration of one of the ion pulses.

22. Apparatus according to claim 14 further comprising a master oscillator for generating a master frequency signal to which the storage RF signal generator and the excitation RF signal generator are responsive in generating the storage RF signal and the excitation RF signal.

23. Apparatus according to claim 22 wherein the storage RF signal generator includes a means responsive to the master frequency signal for setting a phase of the storage RF signal relative to the phase of the master frequency signal.

24. Apparatus according to claim 22 wherein the excitation RF signal generator includes a means responsive to the master frequency signal for setting a phase of the excitation RF signal relative to the phase of the master frequency signal.

25. Apparatus for recording a mass spectrum of ions comprising:

a storage ion trap;

means for placing ions in the storage ion trap;

means for collecting ions near the center of the trap;

a master oscillator for generating a master frequency signal;

a storage RF signal generator responsive to the master frequency signal for producing an ion storage field in the storage ion trap;

an excitation RF signal generator responsive to the master frequency signal for producing an excitation RF signal and an excitation field in the storage ion trap;

an ion detector for generating an ion stream signal in response to ions leaving the storage ion trap; and a phase-sensitive amplifier controlled by the master oscillator in substantial synchronization with the excitation RF signal so that the phase sensitive amplifier is responsive to the ion stream signal only when ion pulses are being ejected from the storage ion trap.

26. Apparatus according to claim 25 wherein the phase-sensitive amplifier comprises a sample-and-hold circuit responsive to the ion stream signal and to the master frequency signal.

27. Apparatus according to claim 26 wherein the master oscillator comprises an oscillator and a logic circuit for generating a periodic clock pulse and the sample-and-hold circuit is responsive to the clock pulse for sampling the ion stream signal.

28. Apparatus according to claim 27 wherein the logic circuit comprises a microprocessor.

29. Apparatus according to claim 27 wherein the logic circuit comprises a programmable array logic circuit.

30. Apparatus according to claim 27 wherein the logic circuit comprises a logic cell array.

31. Apparatus according to claim 27 wherein the master oscillator further comprises a scanning signal generator which generates the clock pulse, the clock pulse being derivative of the master oscillator signal.

32. Apparatus according to claim 31 wherein the frequency of the clock pulse equals the frequency of the signal generated by the excitation RF signal generator.

33. Apparatus according to claim 32 further comprising a phase adjustor by which the relative phase between the scanning signal and the signal generated by the excitation RF signal generator may be adjusted.

34. Apparatus according to claim 27 wherein a duration of one of the clock pulses is substantially equal to a duration of one of the ion pulses.

* * * * *